Patented Nov. 16, 1948

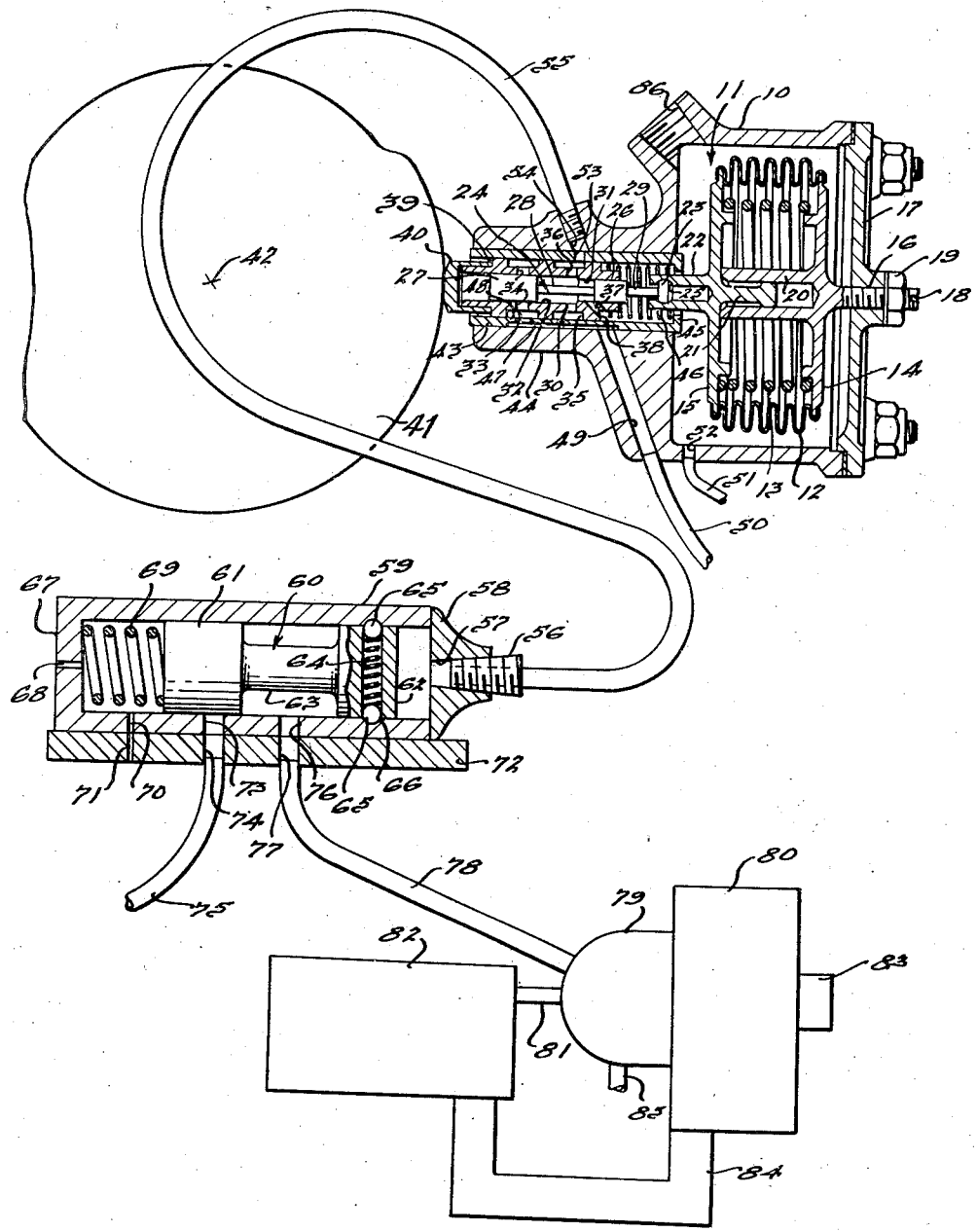

2,453,812

UNITED STATES PATENT OFFICE 2,453,812

ACTUATING VALVE WITH OPPOSED UNEQUAL AREAS

Hubert S. Phelan, Berkley, Mich., assignor to Chrysler Corporation, Highland Park, Mich., a corporation of Delaware Application May 15, 1944, Serial No. 535,604

3 Claims. (Cl. 121—38)

This invention relates to a device responsive to a condition, such as pressure, for establishing one condition or another, such as a high speed ratio or a low speed ratio in a transmission. More specifically, it relates to a device for shifting in response to atmospheric pressure a transmission drivingly connecting a supercharger with an engine supplied by the supercharger.

It is known to drive a supercharger from an engine by means of a transmission having a low-speed ratio for driving the supercharger at an atmospheric pressure higher than a certain value and a high-speed ratio for driving the supercharger at an atmospheric pressure lower than a certain value. This arrangement is employed so that there may be obtained without higher engine speed the higher supercharger speed requisite for maintaining a certain delivery pressure to the engine in spite of lower atmospheric pressure. When the engine is employed as part of an aircraft power plant, the change in atmospheric pressure will in general be due to change in altitude. It is theoretically desirable that the shifting of the transmission from low speed to high speed take place upon decrease of atmospheric pressure to a certain value or increase of altitude to a corresponding value, and the shifting from high speed to low speed, upon increase of atmospheric pressure to the certain value or decrease of altitude to the corresponding value. However, actual operation at or near the predetermined atmospheric pressure or altitude may produce a condition of "hunting" that is common to governors operating upon a certain value of a condition. In other words, the atmospheric pressure and altitude at which a plane flies may decrease and increase from the predetermined values, although the pilot is attempting to maintain a certain altitude, and so the transmission will continually be shifted from one speed ratio to the other and back again. This is undesirable.

I have overcome this difficulty by making arrangements so that the transmission is shifted from low speed to high speed at a certain value of atmospheric pressure and is shifted back to a low speed at a definitely greater value of atmospheric pressure. In terms of altitude this means that the shift from low speed to high speed takes place at one altitude, and the shift back to low speed at a definitely lower altitude. Thus, if the plane is flying generally at a certain altitude, there may be a shift of the transmission either from low speed to high speed or from high speed to low speed, but there will be only one shift whatever it is.

An object of the present invention is to provide an improved means for causing an actuator to establish one conditon or another in response to the existence or arising of a predetermined value of pressure. This may involve a valve arranged to pass pressure fluid for the establishment of one condition and to block the passage of pressure fluid for the establishment of another condition.

Another object is to provide an improved means for shifting a transmission in response to a predetermined value of pressure. The transmission may be a driving connection between an engine and a supercharger supplying the engine and may shift upon arrival of a certain value of atmospheric pressure dependent upon altitude.

A further object is to provide an improved valve adapted to shift a transmission by blocking or unblocking the passage of pressure fluid. The arrangement may be such that passage of fluid by the valve to an actuator for the transmission will cause the shift from one speed ratio to another speed ratio and the blocking of the fluid by the valve will cause the actuator to shift the transmission back to the said one speed ratio.

Other objects will appear from the disclosure.

The single figure of the drawing shows schematically and in section, the novel apparatus of the present invention.

A housing 10 in which is positioned a bellows 11 comprising a corrugated element 12, a spring 13 and end members 14 and 15, is provided. The end member 14 has a threaded extension 16 engaging a threaded opening in an end plate 17 of the housing 10. The threaded extension 16 has in its end a slot 18 for reception of a tool such as a screw driver by which the end member 14 may be adjusted with respect to the end plate 17. A lock nut 19 engages the threaded extension 16. The end member 14 has a tubular extension 20 receiving in telescoping relation an extension 21 on the end member 15. Engagement of the tubular extension 20 with the end member 15 as shown in the drawing limits the collapse of the bellows 11. The end member 15 also has an extension 22 receiving a rounded enlarged portion 23 of a piston valve 24. The rounded enlarged portion 23 fits in a rounded enlargement 25 in the extension 22 and with the enlargement forms a universal connection between the piston valve 24 and the end member 15. The piston valve 24 has a small piston section 26 and a large piston section 27 spaced from the section 26. The piston sections 26 and 27 are joined by a rod-like portion 28, and the enlarged portion 23 and the piston section 26 are joined by a rod-like portion 29. The piston valve 24 is slidably mounted in a sleeve valve 30, which has a small bore 31 receiving the small piston section 26 and a large bore 32 receiving the large piston section 27. The sleeve valve 30 also has an external annular groove 33 from which extend a plurality of peripherally spaced ports 34 providing communication between the groove 33 and the large bore 32. The sleeve valve 30 also has an annular groove 35 from which extend peripherally spaced ports 36 providing communication between the groove 35 and the enlarged bore 32. A relief opening 37 extends from the small bore 31 in the sleeve valve 30 to the exterior of the valve at a shoulder 38 formed at the right end thereof. A shoulder 39 is formed on the left end of the sleeve valve 30, and on the shoulder is mounted a cap valve 40 serving as a cam follower engaging a cam 41 shown only in part and having a center of rotation at a point 42. The sleeve valve 30 is slidably mounted in a sleeve 43 fixedly mounted in a bore provided in a portion 44 of the housing 10. The right end of the sleeve 43 has an inwardly directed flange 45. A spring 46 acts between the flange 45 and the shoulder 38 to maintain the follower 40 in engagement with the cam 41. One side of the sleeve 43 is provided with an external groove 47. An opening 48 extends from the groove 47 to the interior of the sleeve at a point directly opposite the groove 33. A passage 49 formed in the housing 10 communicates with the groove 47. A pressure line 50 is connected to the passage 49. A drain line 51 is connected to an opening 52 communicating with the chamber in the housing 10 in which the bellows 11 is mounted. An opening 53 is formed in one side of the sleeve 43 at a point opposite the groove 35. A passage 54 is formed in the extension 44 of the housing 10 in communication with the opening 53, and a line 55 has threaded engagement with the passage 54. The line 55 terminates in a threaded fitting 56 having threaded engagement with an opening 57 in an end part 58 secured to a cylinder 59. Mounted within the cylinder 59 is a piston valve 60 having spaced piston sections 61 and 62 and a reduced rod-like section 63 joining the sections 61 and 62. The piston section 62 has a bore in which is positioned a spring 64 and balls 65 urged outwardly by the spring 64 into engagement with an annular groove 66 formed within the bore of the cylinder 59. The spring 64, the balls 65, and the groove 66 constitute a detent mechanism tending to hold the piston 60 in the position shown. The left end of the cylinder 59 is provided with a closure portion 67 in which extends a relief opening 68. A spring 69 acts between the piston section 61 and the closure portion 67 to urge the piston valve 60 to the right. The cylinder 59 is provided with a drain opening 70 communicating with a drain opening 71 formed in a support member 72 upon which the cylinder 59 is mounted. The cylinder 59 also has an opening 73 registering with an opening 74 in the support 72 to which is connected a pressure line 75. The cylinder 59 is also provided with an opening 76 registering with an opening 77 formed in the support 72, and a line 78 leads from the opening 77 to a transmission 79 adapted to drive a supercharger 80 from an engine-driven shaft 81 leading from an engine 82. The supercharger 80 may be either of the axial type or of the radial type and is shown to have an inlet 83 for a combustion supporting gas such as air, which it compresses and discharges into a delivery line 84 leading to the engine 82. The transmission 79 has a plurality of speed ratios so that the supercharger 80 may be driven either at a high speed or at a low speed for a given speed of the engine-driven shaft 81. The transmission 79 may be of the type shown in the patent to King, No. 2,248,240 dated July 8, 1941 and is adapted to operate at a high speed ratio when fluid under pressure is supplied to it through the line 78 and to operate at a low speed ratio when no fluid is supplied through the line 78. As in the construction of the patent, the transmission 79 is of the continuously draining type and so a drain 85 for the transmission is shown.

The bellows 11 contains a vacuum or a reduced pressure and is to be subjected to atmospheric pressure communicated to it through an opening 86 formed in the housing 10. The passage 86 may also be connected with some sort of scoop, not shown, that will supply to the bellows 11 a pressure comparable to the pressure supplied to the supercharger 80 through the inlet 83, which may be somewhat different from atmospheric pressure because of a ram effect. As the atmospheric pressure decreases with increase in altitude of a plane in which the engine and supercharger are mounted, the bellows 11 expands causing movement of the end member 15 to the left. This movement is communicated to the piston valve 24 and after this piston valve moves sufficiently to the left, the large piston section 27 will have uncovered the ports 34 so that fluid under pressure supplied through the line 50 and reaching the ports 34 may pass across the rod-like portion 28 through the ports 36, the annular groove 35, the opening 53, and the passage 54 into the line 55. The pressure fluid passes from the line 55 into the right end of the cylinder 59 causing the piston valve 60 to move to the left against the action of the detent mechanism and the spring 69. The piston valve 60 moves to the left until the opening 73 is uncovered by the piston section 61 and the openings 73 and 76 are placed in communication so that the fluid under pressure may flow from the line 75 past the reduced portion 63 and through the line 78 to the transmission 79. Flow of fluid into the transmission 79 causes a shifting of the transmission from a low speed ratio to a high speed ratio, the high speed ratio being required because of the reduction in pressure of the air supplied through the inlet 83 to the supercharger 80.

The piston sections 26 and 27 of the piston valve 24 have already been described respectively as small and large. Thus when fluid under pressure flows past the rod-like portion 28 of the piston valve 24 with uncovering of the ports 34 by the large piston section 27, it acts against a large annular end area of the piston section 27 and a small annular end area of the piston section 26. Since these areas are unequal and are opposed, the piston valve 24 is moved to the left by a force due to this difference in areas. Thus when the large piston section 27 uncovers the ports 34 just a little bit the flow of pressure fluid into the space between the piston sections 26 and 27 causes the pressure fluid to act against the piston valve 24 moving it to the left. Thus the ports 34 need be uncovered only a little bit, for the pressure fluid will move the piston valve 24 farther to the left and complete the uncovering. The arrangement is that the bellows 11 will move the piston valve 24 at a certain predetermined pressure to a point of uncovering of the ports 34 and the action of the pressure fluid against the piston valve 24 is positive and tends to snap the valve to a position in which the ports 34 are completely uncovered.

When atmospheric pressure increases with decrease in altitude of the airplane, the bellows 11 tends to collapse causing the end member 15 to move to the right. This causes the piston valve 24 to be moved to the right, but this movement is resisted by the force applied to the piston valve 24 by the pressure fluid tending to move the valve to the left. Thus the ports 34 are not again covered by the large piston section 27 until the atmospheric pressure has increased to a point definitely above the predetermined value at which the ports 34 were uncovered by the piston section 27. The result is that with decrease in atmospheric pressure the ports 34 are uncovered by the large piston section 27 at a certain predetermined value and are completely uncovered by the force tending to move the piston valve to the left, and the ports 34 are not again covered until the atmospheric pressure has risen to a value definitely above the predetermined value. The advantage of this arrangement is that the plane may be flown at or near an altitude providing the predetermined value of pressure at which the transmission 79 shifts from a low speed ratio to a high speed ratio, and yet once the shift has taken place there will be no "hunting" effect or in other words, the transmission will not be shifted continuously back and forth between the high speed ratio and the low speed ratio, for a definitely lower atmospheric pressure is required for the transmission to be shifted back to the low speed ratio.

Any fluid trapped between the end portion 67 of the cylinder 59 and the piston section 61 may escape through the openings 68 and 70.

Lengthwise adjustment of the sleeve valve 30 provides an adjustment of the predetermined value of the atmospheric pressure at which the shift from low speed ratio to high speed ratio takes place in the transmission 79. For example, if the sleeve valve 30 is moved to the left, then the piston valve 24 must move farther to the left than otherwise in order to cause the piston section 27 to uncover the ports 34. This is accomplished by a greater expansion of the bellows 11 which must be due to a lesser atmospheric pressure. Thus adjustment of the sleeve valve 30 to the left decreases the predetermined value of pressure at which the shifting of the transmission 79 takes place. It will be evident that adjustment of the sleeve valve 30 to the right will increase the aforesaid predetermined value of atmospheric pressure, since then the piston valve 24 will have to move not so far to the left to cause the ports 34 to be uncovered by the piston section 27. The adjustment of the sleeve valve 30 to the left or to the right is effected by rotation of the cam 41. The cam 41 moves the sleeve valve to the right by causing the engagement of a portion of the cam with the follower 40 which portion has a greater spacing from the center of rotation 42. The spring 46 moves the sleeve 30 to the left when the cam 41 is rotated to cause a portion having less distance from the center of rotation 42 to contact the follower 40.

I claim:

1. In combination, a member having an intermediate reduced portion and opposed areas of different size at the reduced portion, means tending to make an increase to a certain magnitude of the force applied in one direction to the member move the member in the said one direction to a certain position, means for supplying fluid under pressure to the reduced portion of the member upon its arrival in the said certain position after movement in the said one direction for causing by action of the pressure fluid against the areas of different size the member to be shifted positively and suddenly in the said one direction from the said certain position and to be held from being shifted in the opposite direction to and beyond the said certain position until lowering of the force applied to the member to a value definitely lower than the said certain magnitude, an actuator shiftable to produce a change between first and second conditions, and means connecting the actuator and the member so as to cause the pressure fluid reaching the reduced portion of the member upon its assumption of the said certain position or therebeyond in the said one direction to pass the reduced portion and to act against the actuator for producing the shift from the first condition to the second condition and to cause the pressure fluid to be blocked from reaching the actuator by the member upon return of the member in the opposite direction to the said certain position or therebeyond for producing a shift from the second condition to the first condition.

2. In combination, a member having an intermediate reduced portion and opposed areas of different size at the reduced portion, means tending to make an increase to a certain magnitude of the force applied in one direction to the member move the member in the said one direction to a certain position, means for supplying fluid under pressure to the reduced portion of the member upon its arrival in the said certain position after movement in the said one direction for causing by action of the pressure fluid against the areas of different size the member to be shifted positively and suddenly in the said one direction from the said certain position and to be held from being shifted in the opposite direction to and beyond the said certain position until lowering of the force applied to the member to a value definitely lower than the said certain magnitude, an actuator shiftable to produce a change between first and second conditions, means connecting the actuator and the member so as to cause the pressure fluid reaching the reduced portion of the member upon its assumption of the said certain position or therebeyond in the said one direction to pass the reduced portion and to act against the actuator for producing the shift from the first condition to the second condition and to cause the pressure fluid to be blocked from reaching the actuator by the member upon return of the member in the opposite direction to the said certain position or therebeyond, and a drain line associated with the member so as to cause the return of the member to blocking position to drain pressure fluid from the means connecting the actuator and the actuator for producing a shift from the second condition to the first condition.

3. In combination, a piston valve having one end portion of relatively large diameter, the other end portion of relatively small diameter, and an intermediate portion of a diameter less than the relatively small diameter for providing opposed relatively large and small areas on the end portions at the ends of the intermediate portion, a sleeve valve having a relatively large bore fitting the large diameter portion of the piston valve, a relatively small bore fitting the small diameter portion of the piston valve, an inlet passage to the large bore, and a drain passage to the small bore, the inlet and outlet passages being so spaced from one another in relation to the spacing between the large and small diameter portions of the piston valve as to cause uncovering and covering of the inlet passage by the large diameter portion to produce, respectively, covering and uncovering of the drain passage by the small diameter portion, means for causing increase of force applied to the piston valve in a direction from the small diameter portion to the large diameter to a certain magnitude to move the piston valve in the said direction to a position producing a slight uncovering of the inlet passage by the large diameter portion of the piston valve, means for supplying pressure fluid to the inlet passage for causing the slight uncovering of the inlet passage to admit pressure fluid to the intermediate portion of the piston valve and the action of the pressure fluid against the large and small areas to move the piston valve further in the said direction to a complete uncovering of the inlet passage, this action of the pressure fluid against the large and small areas preventing return of the piston valve in the opposite direction to and beyond the position of slight uncovering of the inlet passage until reduction of the force applied to the valve to a value definitely below the said certain magnitude, an actuator for producing a shift between first and second conditions, and a conduit connected with the actuator and the sleeve and piston valves so as to pass to the actuator pressure fluid admitted to the intermediate portion of the piston valve through uncovering of the inlet passage for producing the shift from the first condition to the second condition and to be connected to the drain passage upon return of the piston valve to the position covering the inlet passage and uncovering the drain passage for producing the shift from the second condition to the first condition.

HUBERT S. PHELAN.

REFERENCES CITED

The following references are of record in the file of this patent:

UNITED STATES PATENTS

| Number | Name | Date |
|---|---|---|
| 526,149 | Farley | Sept. 18, 1894 |
| 1,175,089 | Turner | Mar. 14, 1916 |
| 1,615,890 | Stevens | Feb. 1, 1927 |
| 1,886,003 | Garrison | Nov. 1, 1932 |
| 1,938,762 | Haas | Dec. 12, 1933 |
| 2,094,449 | Forichon | Sept. 28, 1937 |
| 2,229,345 | Schotz | Jan. 21, 1941 |
| 2,246,476 | Wood | June 17, 1941 |

FOREIGN PATENTS

| Number | Country | Date |
|---|---|---|
| 138,556 | Great Britain | Feb. 12, 1920 |
| 507,460 | Great Britain | June 15, 1939 |